United States Patent [19]
Holloway et al.

[11] 3,822,055
[45] July 2, 1974

[54] ULTRASONIC CLEANING OF RESIN

[75] Inventors: James H. Holloway, Tracy; George E. Petersen, Fremont, both of Calif.

[73] Assignee: General Electric Company, San Jose, Calif.

[22] Filed: Oct. 19, 1972

[21] Appl. No.: 298,887

Related U.S. Application Data

[63] Continuation of Ser. No. 39,030, May 20, 1970.

[52] U.S. Cl............................. 259/1 R, 259/DIG. 44
[51] Int. Cl............................................. B01f 11/02
[58] Field of Search......... 259/1 R, DIG. 44, 72, 18, 259/4; 134/1, 25, 184; 210/19, 33

[56] References Cited
UNITED STATES PATENTS

| | | | |
|---|---|---|---|
| 2,663,623 | 12/1953 | Anderson | 259/1 R |
| 2,671,714 | 3/1954 | McIlhenny | 210/33 X |
| 2,973,312 | 2/1961 | Logan | 134/1 |
| 3,074,856 | 1/1963 | Meliss | 210/19 |
| 3,222,221 | 12/1965 | Branson | 259/1 R |

*Primary Examiner*—Robert W. Jenkins
*Attorney, Agent, or Firm*—Ivor J. James, Jr.; Sam E. Laub; Samuel E. Turner

[57] ABSTRACT

A method of cleaning contaminated resins for reuse comprises establishing a countercurrent flow between the contaminated resin and a carrier fluid for carrying the removed contamination from the resin and applying ultrasonic energy to the countercurrent flow with the countercurrent flow being conducted so that a region of turbulence is achieved where the ultrasonic energy is applied. A cleaning apparatus has means for introducing a contaminated resin and means for introducing a carrier fluid to a treatment zone in a countercurrent flow, means for collecting cleaned resin from the treatment zone, means for removing the carrier fluid from the treatment zone, and ultrasonic energy means for applying an ultrasonic energy field to the countercurrent flow in the treatment zone.

16 Claims, 5 Drawing Figures

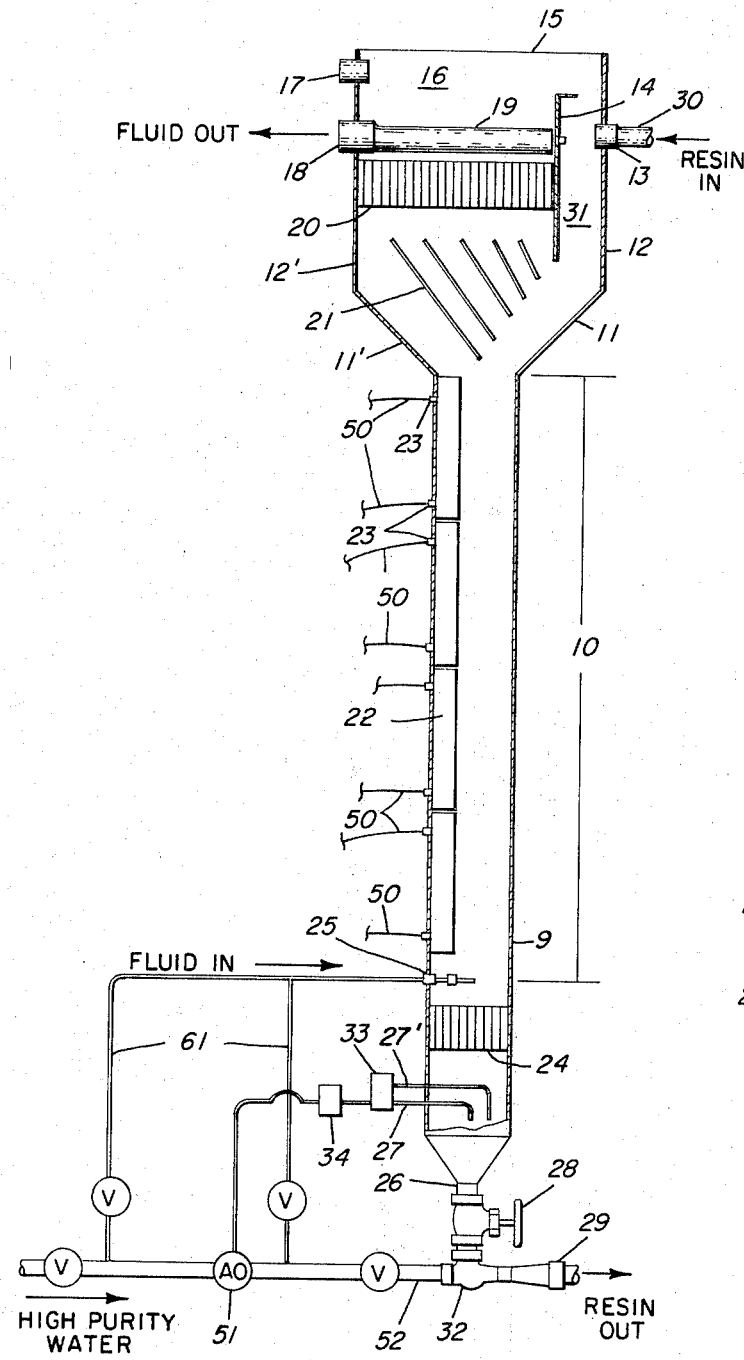
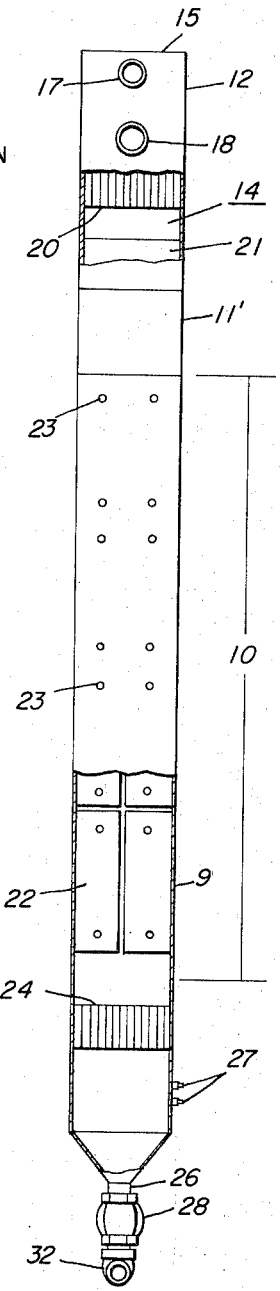
Fig. 1
Fig. 2
INVENTORS:
JAMES H. HOLLOWAY
GEORGE E. PETERSEN
BY: *Sam Laub*
ATTORNEY

ULTRASONIC CLEANING OF RESIN

This is a continuation, of application Ser. No. 39,030, filed May 30, 1970.

BACKGROUND OF THE INVENTION

This invention relates to cleaning contaminated resins in general, and in particular relates to cleaning of contaminated ion exchange resins. Contaminated fluids can be treated with resins, especially ion exchange resins, to remove the contamination from the fluid. One particular application of resins for cleaning fluids is during the operation of electric power plants. The water used in all power plants gradually builds up contamination consisting of corrosion and erosion products (crud), impurities in the incoming water and contamination from failed fuel in nuclear reactors. In order to prevent excessive build-up of the contamination in the water of the power plant with resulting fouling of components, it is necessary to treat the water to remove contamination. Contamination removal from water condensed in steam turbines and from water in the recirculation system of a nuclear reactor are representative of treatments practiced for electrical power plants.

At a certain point in operation, the resins used to remove contamination from fluids experience a build-up of contamination on the resin particles and in the resin bed so that a pressure drop is experienced or eventual breakthrough of the contamination from the resin bed occurs. This breakthrough of contamination, high pressure drop, or both, often occurs before the ion exchange capacity of the resin has been fully expended and necessitates replacement of the resin bed with a bed of new resin or a resin rejuvenated by chemical treatment. Because of the expense of ion exchange resins, it is impracticable to dispose of these resins after one cycle, and current practice is to apply resin clean-up or rejuvenation by chemical treatments.

The present art of resin cleaning and rejuvenation consists mainly of using chemical treatments combined with the washing cycles. For example, in one process of restoration, the anion resins are mixed with sodium hydroxide and cation resins are mixed with sulfuric acid for a period of time and then rinsed with water. Other chemicals commonly used are hydrochloric acid, nitric acid and strong bases. These chemicals are used in large amounts with considerable time being required to achieve restoration, and the disposal of the resulting aqueous waste materials creates a problem, especially if radioactive waste materials are involved. Fracturing of the resin beads often occurs during chemical rejuvenation due to osmotic shock. In addition, the current chemical treatments frequently tend to be detrimental in that the iron oxides present as contamination on the resin are converted into soluble iron ions which are then absorbed on the resins by ion exchange. The end result of chemical treatment is an inefficient restoration of the cleaning capacity of the resin.

Mechanical methods of restoration have also been used, but the principal disadvantage of these methods has been the fracturing of the resin particles. The fracturing of the resin particles is undesirable because the preservation of the original particle size is essential to the proper hydraulic operation of the resin bed.

Further efforts in the prior art include U.S. Pat. No. 3,398,090 which combines a water wash in a counter flow to a spent resin to create a backwash action while at the same time subjecting the bed to vibratory agitation having a frequency within the audible and sub-audible range. This process exposes the resin beads to physical harm due to the high energy input and exposes personnel to a disturbing sound level.

A still further method of cleaning resins is presented in British Pat. Specification No. 824,831 consisting in subjecting the resin medium to the action of an ultrasonic wave generator for a convenient period of time and also to a washing step carried out with pure water or any other solution, the washing step being done subsequent to or during the ultrasonic treatment step. While this method eliminates some of the drawbacks associated with the foregoing processes, this method does not assure separation of the resin beads from each other in the wash water during application of ultrasonic energy to clean the resin. Also, only a batch-type operation is taught in this reference which would not be practical where large quantities of the resin are to be cleaned.

SUMMARY OF THE INVENTION

The foregoing deficiencies of the prior art are overcome in the present invention where the contaminated resin medium is introduced to a treatment zone together with a carrier fluid to create a countercurrent flow between the contaminated resin medium and the carrier fluid. The countercurrent flow is conducted as an elutriation step and in practice is conducted to create a zone of turbulence between the contaminated resin medium and the carrier fluid. Ultrasonic energy is then applied to the zone of turbulence to clean the resin medium.

It is an object of this invention to restore contaminated ion exchange resins by removing physically adhering and admixed materials from the resins so that the visual appearance of the resin is similar to an unused, virgin resin.

It is a further object of this invention to achieve a continuous process using ultrasonic energy for cleaning contaminated resins for reuse.

A still further object of this invention is to provide a process and apparatus for restoring spent resins having radioactive contamination associated with the resin by using a minimum of carrier fluid in contact with the resin so that there is a minimal amount of carrier fluid with radioactive waste for disposal or treatment to eliminate the waste from the carrier fluid.

A still further object of this invention is to provide a process for restoring spent resins whereby the radioactive waste products in the carrier fluid can be separated by simple filtration leaving a carrier fluid free of waste products.

Other objects and advantages of this invention will become apparent to a person skilled in the art from a reading of the following specification, the appended claims, and by reference to the drawings, in which:

FIG. 1 is a front view in vertical section of a treatment apparatus according to the present invention.

FIG. 2 is a side view, partly in vertical section, of the treatment apparatus presented in FIG. 1.

DETAILED DESCRIPTION OF THE INVENTION

Figure 3:
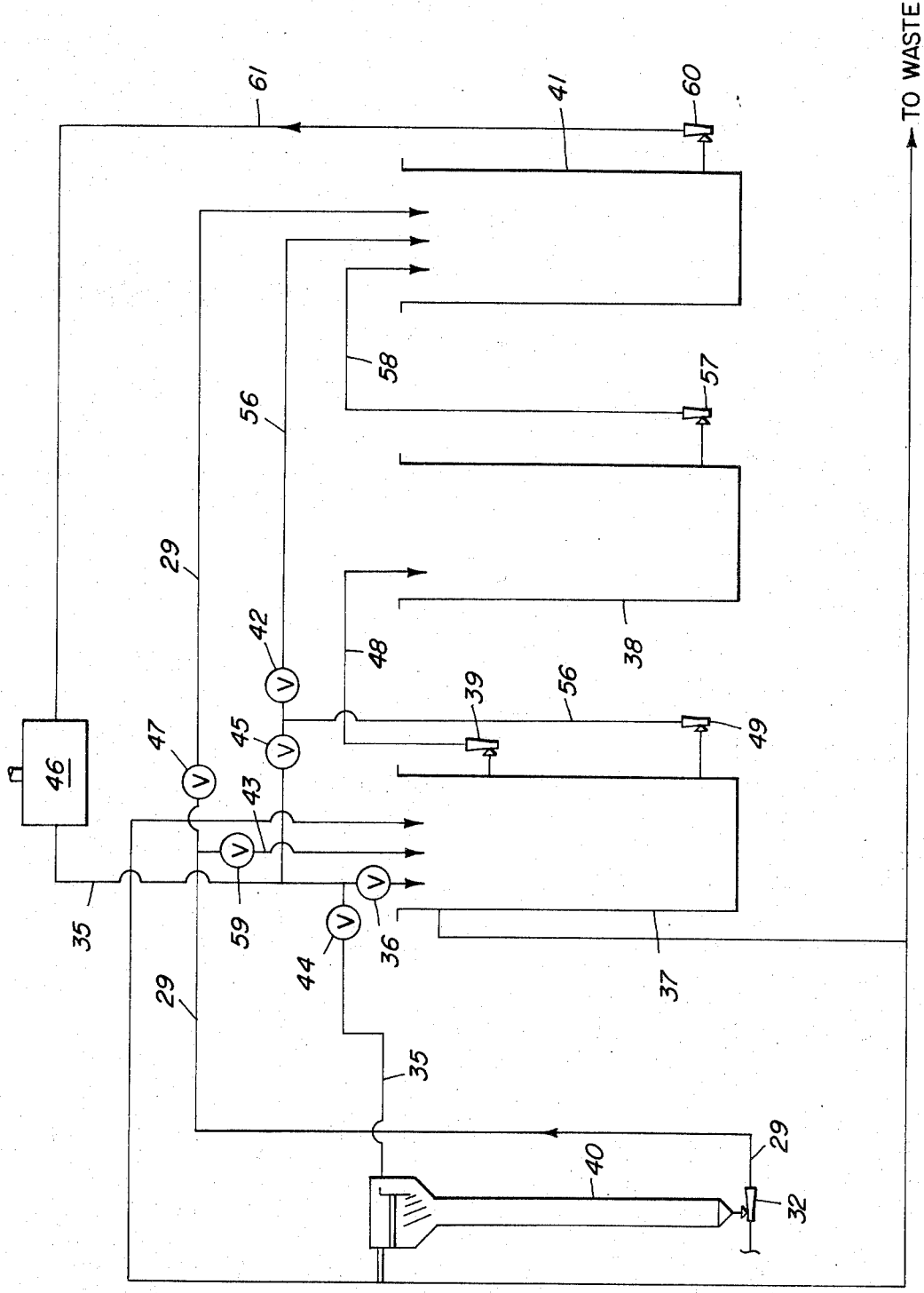
FIG. 3 shows a treatment apparatus according to the teaching of this invention integrated into a typical mixed bed ion exchange resin rejuvenation facility for receiving contaminated resins for ultrasonic cleaning and chemical treatment.

The process presented in this invention cleans a contaminated resin medium by the following steps: (a) establishing a hydraulic classification of the resin particles in a turbulent condition in a treatment zone, the hydraulic classification being the result of a countercurrent flow between a stream of the contaminated resin particles and a carrier fluid for carrying the removed contamination from the resin and (b) applying ultrasonic energy to the treatment zone to remove the contamination from the resin particles. As presented in this invention, this process departs from the prior art of resin treatment in that contamination is removed from the resin by enabling ultrasonic energy to impinge on the individual resin particles as the particles are temporarily suspended in a turbulent condition in the carrier fluid. In this manner each individual resin particle is surrounded by the carrier fluid when the ultrasonic energy impinges on the resin particle, and the individual resin particle is not shielded by other resin particles in a compact mass preventing penetration of the mass of resin with the ultrasonic energy. This process enables more uniform cleaning on all surfaces of the resin particles because ultrasonic energy is not dissipated in a compact mass of resin particles. This process enables more thorough cleaning of resin particles in that each individual resin particle is exposed on all surfaces to the carrier fluid enabling all surfaces of the resin particle to be cleaned uniformly by the ultrasonic energy. The hydraulic classification also removes any small resin bead portions which have been damaged by fracturing during utilization of the resin in treatment of liquid media. In summary the process of this invention presents the desirable features of a hydraulic classification technique to enable efficient impingement of ultrasonic energy on contaminated resin beads.

The process of this invention utilizes ultrasonic energy to break the bond between the contamination adhering to the resin beads and does not involve a chemical treatment of the resin. This process is designed to remove contamination which builds up on resin beads and throughout a resin bed during use of the resin to remove suspended contamination from liquid media. When the resin particle is suspended in the treatment zone in the process of this invention, the impingement of the ultrasonic energy on the bead serves to break the bond between the adhering contamination and the resin bead. The hydraulic classification has the lighter weight particles such as fractured resin beads being carried off with the removed contamination in the carrier fluid.

The hydraulic classification is achieved when the aqueous stream of resin medium is introduced at one end of the treatment zone and the carrier fluid is introduced at the opposite end of the treatment zone with a flow rate greater than the terminal velocity of the fractured resin particles and contamination associated with the resin. In practice the flow rate of the carrier fluid is 0.1 to 10 linear feet per minute, opposite in direction to that of the resin medium. The ratio of water to resin in the treatment zone can vary from 1:1 to 1:70 in the practice of this invention. It is necessary for the rate of movement of the resin particles to exceed the rate of movement of the carrier fluid so that the resin particles collect at the end of the treatment zone opposite to their point of introduction. In practice the resin particles are allowed to build up below the treatment zone so that a bed height of several inches results. The flow rate of the carrier fluid is adjusted so that particles of resin having a diameter of about one-half or greater the diameter of virgin resin particles are not removed with the carrier fluid.

The resin cleaning apparatuses shown in the drawings are positioned vertically but this in no way is meant to be a limitation on the operation of these apparatuses as they operate in positions deviating from the vertical. Using a 6-inch by 12-inch rectangular treatment zone 6 feet in height with ultrasonic units positioned in the zone, a volume of resin up to approximately 150 cubic feet per hour has been successfully treated removing approximately 95 percent by weight of physically adhering and associated contamination.

The carrier fluid commonly employed in the practice of this process is water but various chemical additions can be made when desired or necessary to further improve the treatment of the resin. These additions will not be specified in detail as they are known to persons skilled in the art and depend on the resin system being cleaned. Exemplary of these additions would be up to 10 percent by weight of acetone or a water soluble alcohol such as n-butyl alcohol when hydrocarbon residues such as oils and greases are to be removed from the resins.

Referring now to FIGS. 1 and 2 there are shown a front view in section and a side view partly in section, respectively, of an apparatus designed to carry out the foregoing process of resin treatment. A housing is provided having a housing portion 9 including a treatment zone 10 of desired dimensions. For convenience of presentation, FIG. 2 does not show the associated piping and connections presented toward the lower portion of FIG. 1. The treatment zone ends where portion 9 connects with slanted portions 11 and 11' of the housing, which portions 11, 11', 12, 12' and cover 15 of the housing form an expanded chamber 16. The lower extent of the treatment zone is approximately defined by inlet 25 for the incoming carrier fluid. Inlet 13 is connected with piping 30 for introducing an ion exchange resin which is contaminated to the extent that cleaning is desirable. Flow guide 14 is mounted in chamber 16 in front of inlet 13 and serves to form a channel 31 and to direct the incoming contaminated resin downward toward the treatment zone 10. The housing forms an enclosed chamber 16 with one outlet 17 serving as an overflow safety outlet on the opposite side of chamber 16 from inlet 13. Outlet 18 on the opposite side of chamber 16 from resin inlet 13 is for the carrier fluid which at this point has associated contamination and crud removed from the incoming resin. Pipe 19 empties into outlet 18 with the other end of pipe 19 being connected to flow guide 14. The upper portion of pipe 19 is cut away to form an open channel so that as the carrier fluid builds up in chamber 16 it enters pipe 19 and passes out outlet 18 to connected piping for disposal or treatment (such as filtration) to remove the associated contamination from the carrier fluid. Positioned beneath pipe 19 is an open grid section 20 in chamber 16 running between portion 12' of the housing and flow guide 14 through which the spent carrier fluid passes as it moves toward pipe 19. Grid section 20 serves as a quiescent settling zone for resin rising with the carrier fluid into chamber 16 to enable the resin beads of sufficient size as stated above to settle out of the carrier fluid. Baffles 21 are mounted at angles intermediate between the approximately vertical guide 14 and the slanted portion 11' of the housing of the resin cleaner. These baffles 21 serve to reduce the turbulence of the carrier fluid and to direct the upward movement of the carrier fluid in chamber 16.

On the inside of rectangular zone 10 are a series of ultrasonic transducer means 22 mounted to give ultrasonic energy waves which move horizontally across zone 10 and the generally vertical directions of countercurrent flow of liquid and solids in zone 10. The ultrasonic transducers selected for utilization in the present apparatus have the capability of generating a frequency in the range of about 18,000 to about 50,000 cycles per second, preferably about 20,000 to about 28,000 cycles per second. Representative units are manufactured by the Branson Instrument Company and have the following physical characteristics. The piezoelectric crystals used as the transducers are mounted inside welded type 316 stainless steel rectangular units. The transducer units are immersible in fluid and as shown in FIG. 1 are mounted inside housing portion 9 by fastening means (bulkhead mounting lugs) 23 forming a fluid-tight mounting. Electrical input to the transducers was made through electrical connectors 50 which are connected with the transducers through the gasketed bulkhead mounting lugs 23.

Figure 4:
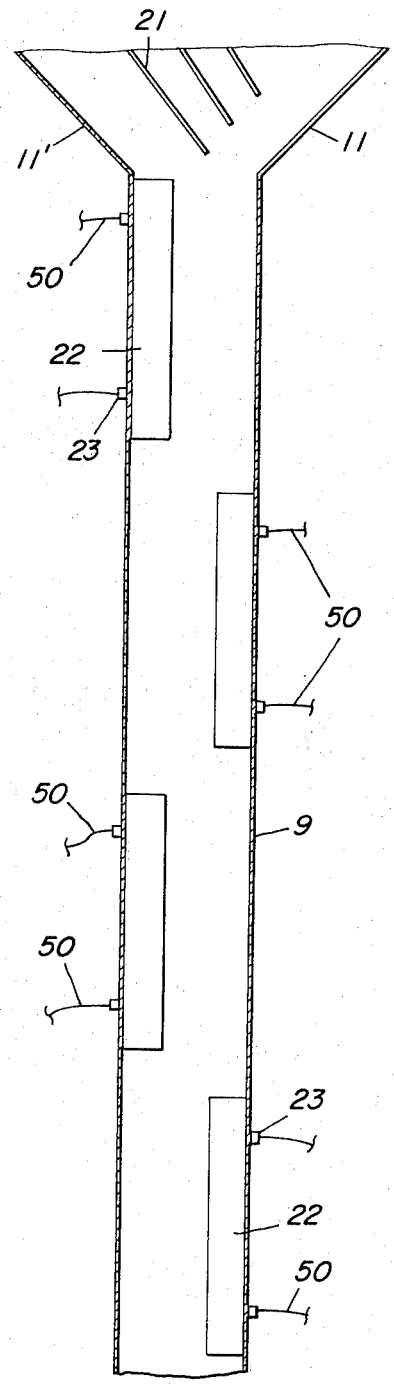
FIGS. 4 and 5 show a front view and an isometric view respectively of the treatment zone of the apparatus presented in this invention having different arrangements for the ultrasonic transducer units.
Figure 5:
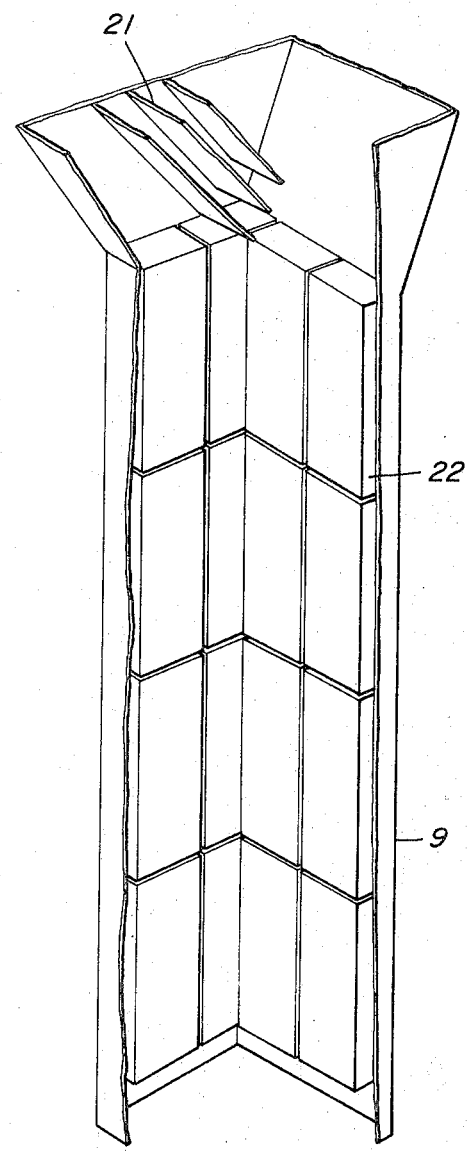

FIG. 2 shows eight transducers mounted in place by fastening means 23. In mounting the ultrasonic transducers 22, it is preferred to have the transducers 22 located so that no interference results between the energy outputs of the units with the result of poorer cleaning action on the resin beads. FIG. 4 shows another arrangement in which the transducers 22 are alternated from side to side in zone 10 with resulting energy fields projected in opposite directions. Still another arrangement is shown in FIG. 5 in which two sets of eight ultrasonic transducers 22 are mounted within zone 10 with the second set of eight transducers being positioned at approximately 90° to the first set of eight transducers. While the arrangement in FIG. 5 has some minimal interference between the two sets of transducers, the greater ultrasonic energy input more than compensates for the lost energy due to interference giving superior cleaning of the resins.

Toward the lower part of housing portion 9 in FIG. 1 is an inlet 25 for the fresh carrier fluid from pipes 61 and below inlet 25 is a second grid section 24. The cleaned resin is collected and allowed to build up a certain distance above outlet 26, and in this manner the incoming carrier fluid is forced upward in zone 10 from inlet 25 due to the effect of the buildup of resin above outlet 26. This prevents the incoming carrier fluid from going out resin outlet 26. The incoming carrier fluid also tends to keep the cleaned resin collected below grid section 24 forced out opening 26. Grid section 24 helps keep the build-up of resin below section 24 approximately horizontal.

During operation of the resin cleaner, valve 28 is maintained in an open position. Electrical signal generating probes 27 and 27' are connected with a conductivity monitor 33 and a current-to-pressure converter 34. An electrical signal from converter 34 actuates air-operated valve 51 which either increases or decreases the amount of high purity water through line 52 to eductor 32. When in operation, eductor 32 has the water from line 52 moving resin from outlet 26 into pipe 29.

Metal probes 27 and 27' are positioned at the desired point for the maximum and minimum upward accumulation of the resin above outlet 26. When the resin builds up and contacts the tips of probe 27 and probe 27', the probes electrically actuate eductor 32 through conductivity monitor 33 and converter 34 slightly opening air-operated valve 51. This allows water to flow through line 52 to eductor 32 releasing resin into pipe 29 which takes the resin to a storage tank or back to a container for use in cleaning contaminated fluids. When the resin level falls below probes 27 and 27' this electrically actuates eductor 32 through monitor 33 and converter 34 either closing or restricting the air-operated valve 51. This either stops or reduces the water flowing in line 52 to eductor 32 in turn either stopping or lowering the rate of release of resin into pipe 29. The difference in conductivity between water and the cleaned resin beads is sufficient to enable an electrical circuit to be completed with the resin in contact with probes 27 and 27' but to have the electrical circuit interrupted when the resin drops from contact with probes 27 and 27'. The probe device operates on the principle that the amount of water flowing through line 52 educting resin is directly proportional to the amount of resin between the horizontal portions of probes 27 and 27'. Manual means can be used to pass water in line 52 to eductor 32 to remove completely all resin at the end of a cleaning run.

To begin a processing run of contaminated resin, valve 28 is closed and zone 10 and chamber 16 are filled with the carrier fluid (such as high purity water) from inlet 25 until the fluid reaches pipe 19. At this time the ultrasonic transducers 22 are turned on and allowed to reach their operating conditions with traveling energy fields across zone 10. The contaminated resin to be treated is then introduced into zone 10 from inlet 13 and passes down channel 31 between guide 14 in front of inlet 13 and portion 12 of the housing. Valve 28 is turned to full open position leaving the resin collected at outlet 26 responsive to eductor 32. The flow rates of the carrier fluid and the incoming resin are adjusted so that the rate of movement of the resin particles of desired diameter downward in zone 10 is greater than the rate of movement of the carrier fluid in the opposite direction in zone 10. In zone 10 there is a turbulent condition which separates each individual resin particle so that it is temporarily suspended in the carrier fluid and substantially segregated from adjacent particles so that each particle is surrounded by the carrier fluid while the ultrasonic energy from transducers 22 impinges upon the resin particles thereby freeing the particles from associated contamination. In this manner, the closer the resin comes to outlet 26 the cleaner the condition of the resin and the carrier fluid, while the carrier fluid leaving zone 10 into chamber 16 has the highest concentration of removed contamination and the incoming resin from inlet 13 is in its most contaminated state.

The cleaned resin is allowed to build up above outlet 26 until it reaches the ends of probes 27 and 27' which completes a circuit with an electrical output to conductivity monitor 33, which actuates converter 34 to emit air to open air-operated valve 51. Water flows through line 52 to operate eductor 32 passing resin into line 29 from outlet 26 of the resin cleaner 10 in amounts corresponding to the accumulation of resin between probes 27 and 27'.

Zone 10 is of a restricted cross section, either rectangular, circular or square in cross section, which has a relatively uniform rate of movement of the carrier fluid toward chamber 16. When the carrier fluid enters chamber 16 the velocity is greatly reduced due to the expansion in cross section of chamber 16 over that of zone 10. This expansion in cross section gives a much greater downward velocity to any resin particles of desired size as defined above still carried within the carrier fluid so that by the time the carrier fluid reaches baffles 21 there is a minimum of such resin particles still carried in the carrier fluid. The baffles 21 prevent the build-up of contamination in chamber 16 and serve to direct the carrier fluid toward outlet pipe 19 and keep the carrier fluid separated from the incoming contaminated resin. Grid section 20 serves to dissipate any lateral movement of the carrier fluid enabling the carrier fluid to build up until it reaches pipe 19 and outlet 18.

FIG. 3 shows the position of an ultrasonic resin cleaner 40 in a power plant to treat contaminated resin received from a tank 46 such as a tank receiving the condensate from a steam turbine. One method of resin treatment involves the use of an acid in tank 37 and a base in tank 38 to rejuvenate the resin. This step of chemical rejuvenation is optional and would normally be performed after cleaning the resin in the ultrasonic resin cleaner or omitted if not needed. In practice the contaminated resin is released from tank 46 into line 35, and if the chemical rejuvenation is to be omitted or performed after ultrasonic cleaning, valves 36 and 45 are closed and valve 44 is open so that contaminated resin would directly enter the ultrasonic resin cleaner 40 from line 35. As the cleaned resin collects at the bottom of ultrasonic resin cleaner 40 it is educted out eductor 32 into pipe 29 at which point there are two options available; the resin can be directed to tank 41 if valve 47 is open and valve 59 is closed or the resin can be directed into line 43 if valve 47 is closed and valve 59 is open. In the latter case, the resin then enters tank 37 where the cation portion of the resin is separated for treatment in tank 37 with the anion portion being educted out of tank 37 through eductor 39 into line 48 to tank 38 for chemical treatment. After the cation portion of the resin is chemically treated, it is educted out of tank 37 through eductor 49 in line 56. Since valve 45 is closed and valve 42 is open at this time, the cation portion of the resin travels through valve 42 and line 56 to mixing tank 41. After the anion portion is treated in tank 38 it is educted out eductor 57 into line 58 to mixing tank 41. Mixing tank 41 has means enabling proper combination of the cation portion and the anion portion of the resin and an eductor 60 to move the resin back to tank 46.

The cleaned resin discharged from the ultrasonic cleaner 40 can be routed to tank 37 through lines 29 and 43 by opening valve 59 and closing valve 47. If it is desirable to clean the resin further by a second cycle through the resin cleaner 40, the resin can be recycled out of tank 37 through eductor 49 to line 56 to line 35 to the ultrasonic cleaner 40 by opening valves 45 and 44 and eductor 49 and by closing valves 42 and 36.

Resin cleaned a second time in resin cleaner 40 can then be transported back to tank 37 through line 29 by opening valve 59 and closing valve 47.

If the cleaned resin coming out of the ultrasonic cleaner 40 is not to be chemically rejuvenated, the resin is educted out of the resin cleaner 40 through eductor 32 into line 29. Valve 47 is maintained opened with valve 59 being closed so the resin flows from line 29 into mixing tank 41.

The cation portion of the resin is treated with acid in tank 37, such as a 10 percent by weight aqueous sulfuric acid solution, and the anion portion of the resin is treated with a base, such as a four percent by weight sodium hydroxide solution.

The foregoing discussion of FIG. 3 to show the advancement of the contaminated resin from its point of use through the cleaning sequence with or without chemical rejuvenation to a condition suitable for reuse in treating fluids is meant to be exemplary only and not to serve as a limitation in any sense on the teaching of this invention. Moreover the manner in which the resin is advanced to the ultrasonic resin cleaner may be varied, as will be apparent to a person skilled in the art, to include one or more additional treatment steps before or after the ultrasonic cleaning step. Frequencies of ultrasonic energy applied and physical location and positioning of the ultrasonic resin cleaner may also be varied as presented in the foregoing discussion.

While the present invention has been presented for resin treatment on a continuous basis rather than a batch-type operation, the ultrasonic resin cleaning process with the associated apparatus of this invention can be adapted for a batch-type operation.

In practice it has been found desirable to design the ultrasonic resin cleaning unit so that the resin particles are subjected to the ultrasonic energy fields from ultrasonic transducers 22 for a period of about 0.1 to about 2.0 minutes, preferably about 0.5 to about 1.0 minutes. In practice it has been found desirable to have the resin particles in the ultrasonic resin cleaner for about 1.0 to about 3.0 minutes which represents the passage from inlet 13 to outlet 26. If additional cleaning is needed or desired, the resin may be recycled through the ultrasonic resin cleaner for an additional cycle(s).

The following examples are offered to show a representative process of the disclosed invention as carried out to treat a contaminated, crud-loaded resin used to remove the contamination and crud from the steam turbine condensate in a nuclear powered electrical generating plant. These examples are offered to be representative of the teaching of this invention and in no way serve to limit the teaching of this invention.

EXAMPLE 1

An apparatus as shown in FIGS. 1 and 2 consists of a housing with a rectangular portion 9 having dimensions of 9 inches by 12 inches with a height of 8½ feet with a tapered lower portion ending with outlet 26. The 8 ultrasonic transducers 22 are mounted on one of the 12-inch faces and extend approximately 3 inches from portion 9 of the housing which is made of stainless steel. The chamber 16 of the resin cleaner is approximately 4 feet in height having at its maximum dimensions a rectangular shape of 1 foot by 2½ feet.

The 8 ultrasonic transducers are manufactured by the Branson Instrument Company and consist of piezo-electric crystals mounted inside welded stainless steel rectangular boxes of approximate dimensions of 3½ inches by 6 inches by 18 inches in height. The transducer boxes are immersible and are mounted along portion 9 as shown in FIGS. 1 and 2 (4 units high along portion 9 and 2 units abreast). The 8 units are operated at a power input of 4.8 kilowatts during cleaning of the resin.

The lower portion of the apparatus tapers to outlet 26 which is 1½ inches in diameter while inlet 13 for the resin has a diameter of 2 inches. Outlet 18 for the carrier fluid is 2½ inches in diameter and inlet 25 for the carrier fluid is 1 inch in diameter. Grid section 24 consists of slotted stainless steel sheets one-sixteenth inch in thickness fitted together to form a grid with openings 1 inch square. The grid section 24 fills housing 9 as its overall dimensions are 9 inches by 12 inches with a height of 5 inches. Grid section 20 is constructed identical to grid section 24 except its overall dimensions are 2 feet by 1 foot by 5 inches in height. The overflow safety outlet 17 is 3 inches in diameter.

The unit is designed to process approximately 1 cubic foot of resin per minute receiving a condensate demineralizer resin bed from a resin tower for cleaning steam turbine condensate. The resin is a polystyrene divinyl benzene resin having a composition of 2 parts cation resin of Dowex 50 W × 8 having sulfonic acid functional groups per 1 part anion resin of Dowex 50 1 × 8 having amine functional groups.

The resin was introduced into the ultrasonic resin cleaning unit through inlet 13 at the rate of approximately 1 cubic foot per minute. The water used in moving the resin through inlet 13 into the resin cleaning unit was approximately 16 gallons per minute. Water educted with the resin at outlet 26 (based on an approximate void volume of 0.5) was approximately 8 gallons per minute. The carrier fluid, here high purity water, was added at inlet 25 at the rate of approximately 3.5 gallons per minute.

To begin the run, valve 28 is closed so zone 10 is filled with water from inlet 25. When water starts leaving outlet 18, the ultrasonic transducers 22 are turned on and allowed to reach operating conditions using 4.8 kilowatts of power. Contaminated resin is then introduced into channel 31 from inlet 13. Valve 28 is turned to open position and when resin builds up in the lower portion of zone 10 to form an electrical contact with probes 27 and 27', electrical energy actuates conductivity monitor 33. Monitor 33 gives a current input to converter 34 opening air valve 51. Air valve 51 lets high purity water in line 52 operate eductor 32 to remove the cleaned resin into pipe 29.

The power input into the ultrasonic transducers of 4.8 kilowatts was approximately 5.5 watts per square inch of transducer face area in zone 10 during the test. The waste effluent leaving outlet 18 was 25 gallons per minute which was directly processed back to the system water of the plant by filtration - leaving no liquid radioactive waste discharge. Visual inspection of the resin sampled before and after ultrasonic cleaning and compared with unused virgin resin indicated that approximately all of the crud and contamination was removed from the surfaces of the resin beads.

EXAMPLE 2

Using the same apparatus, the procedure of example 1 is repeated except 2 cubic feet per minute of contaminated resin of the same composition were introduced to the ultrasonic resin cleaning unit for treatment. Visual inspection of the cleaned resin gave the same excellent appearance achieved in Example 1.

EXAMPLE 3

Using the same apparatus, the procedure of example 1 is repeated except the power input to the transducers is reduced to 3 kilowatts. Visual inspection of the cleaned resin gave the same excellent appearance achieved in Example 1.

The present invention offers significant improvements in the cleaning of ion exchange resins. In particular radioactive liquid waste products can be eliminated when the resin to be cleaned has associated radioactive contamination. The resin is restored to a condition which, except for chemically reacted portions on the resin beads, gives a visual appearance comparable to that of an unused, virgin ion exchange resin. Another striking improvement is that the resin cleaning unit and process of this invention reduce the frequency of the costly use of chemicals in restoring contaminated ion exchange resins.

The particular forms of the invention of an ultrasonic resin cleaning process and apparatus described and illustrated in the accompanying drawings are presented as examples of how the invention may be applied. It is to be understood that the phraseology and terminology employed herein is used for the purpose of description and not limitation. Other forms, embodiments and applications of the invention coming within the proper scope of the appended claims will readily suggest themselves to those skilled in the art.

We claim:

1. A resin cleaning apparatus for cleaning resins containing undesired contamination comprising, in combination,
   a. a housing generally in one plane having a portion defining a treatment zone for receiving and discharging a countercurrent flow of the contaminated resin and a carrier fluid, a portion defining a chamber of greater cross section than the treatment zone for separation of the resin and the carrier fluid, and a portion defining a collection zone for treated resin,
   b. ultrasonic transducer means generating an ultrasonic energy field in the treatment zone,
   c. inlet means for introducing the resin in the chamber of the housing,
   d. a flow guide defining a channel in front of the inlet means in the chamber, the flow guide directing the incoming resin toward one end of the treatment zone,
   e. fluid operated eductor means forming an outlet to the housing for removing the resin from the collection zone,
   f. inlet means for introducing the carrier fluid at the opposite end of the housing portion defining the treatment zone from the end receiving the resin,
   g. outlet means in the chamber of the housing for removing the carrier fluid from the treatment zone,
   h. a grid section located under the outlet means in the chamber and serving as a quiescent settling means for the resin rising with the carrier fluid, and
   i. a multiplicity of baffles mounted in the chamber under the grid section to direct fluid entering the chamber from the treatment zone toward the grid section.

2. The resin cleaning apparatus according to claim 1 in which a multiplicity of ultrasonic transducers are positioned in the treatment zone.

3. The resin cleaning apparatus according to claim 18 in which an overflow outlet is positioned in the chamber.

4. The resin cleaning apparatus according to claim 1 in combination with inlet means for the carrier fluid for controlling the countercurrent flow of contaminated resin and carrier fluid to separate the resin beads in the carrier fluid adjacent the transducer means.

5. The resin cleaning apparatus according to claim 1 in which the ultrasonic transducer means are capable of operating in the range of about 18,000 to about 50,000 cycles per second.

6. The resin cleaning apparatus according to claim 1 in which a multiplicity of ultrasonic transducers are positioned in the treatment zone and are divided into two sets forming separate planes mounted at approximately 90° to each other.

7. The resin cleaning apparatus according to claim 1 in which a multiplicity of ultrasonic transducers are positioned in the treatment zone and are divided into two sets mounted in a manner to avoid interference on opposite sides of the treatment zone.

8. The resin cleaning apparatus according to claim 1 in which a grid section is mounted in the housing between the portion defining a collection zone and the portion defining a treatment zone.

9. The resin cleaning apparatus according to claim 1 in which the fluid operated eductor means is responsive to probe means positioned in the portion of the housing defining a collection zone, the probe means giving an output to the eductor means corresponding to the level of collected resin.

10. A resin cleaning apparatus for cleaning particulate resins in the form of beads containing undesired contamination in physical association with the resin, the apparatus comprising, in combination,
   a. a housing generally in one plane having
      i. a portion defining a treatment zone for receiving and discharging a countercurrent flow of the contaminated resin and a carrier fluid,
      ii. a portion defining a collection zone for treated resin, and
      iii. a portion defining a chamber of greater cross section than the treatment zone for separation of the resin and the carrier fluid,
   b. a first grid section mounted in the housing between the portion defining a treatment zone and the portion defining a collection zone,
   c. a multiplicity of ultrasonic transducers mounted in the portion of the housing defining a treatment zone for generating an ultrasonic energy field in the treatment zone,
   d. inlet means in one portion of the chamber for introducing the resin through the chamber to the treatment zone for cleaning,
   e. a flow guide defining a channel in front of the inlet means in the chamber, the flow guide directing the incoming resin toward the treatment zone,
   f. fluid operated eductor means forming an outlet to the portion of the housing defining the collection zone for removal of the resin collected therein,
   g. inlet means entering the housing above the first grid section for introducing the carrier fluid in the portion of the housing defining the treatment zone,
   h. a second grid section mounted in the chamber and extending laterally to the direction of fluid flow in the chamber,
   i. a multiplicity of baffles being mounted in the chamber under the grid section to direct fluid entering the chamber from the treatment zone toward the second grid section, and
   j. outlet means in the chamber portion of the housing for removing the carrier fluid rising from the treatment zone.

11. A resin cleaning apparatus according to claim 10 in which an overflow outlet is positioned in the chamber.

12. A resin cleaning apparatus according to claim 10 in which the flow guide is connected to the second grid section and the outlet means in the chamber.

13. A resin cleaning apparatus according to claim 10 in which a multiplicity of ultrasonic transducers are positioned in the treatment zone and are divided into two groups mounted at approximately 90° to each other.

14. A resin cleaning apparatus according to claim 10 in which a multiplicity of ultrasonic transducers are positioned in the treatment zone and are divided into two groups mounted on opposite sides of the treatment zone.

15. The resin cleaning apparatus according to claim 10 in which the ultrasonic transducer means are capable of operating in the range of about 18,000 to about 50,000 cycles per second.

16. The resin cleaning apparatus according to claim 10 in which the fluid operated eductor means is responsive to probe means positioned in the portion of the housing defining a collection zone, the probe means giving an output to the eductor means corresponding to the level of collected resin.

* * * * *

UNITED STATES PATENT OFFICE
CERTIFICATE OF CORRECTION

Patent No. 3,822,055                                       Dated July 2, 1974

Inventor(s) J. H. Holloway/G. E. Petersen

It is certified that error appears in the above-identified patent and that said Letters Patent are hereby corrected as shown below:

Column 1, line 4, "May 30," should be --May 20,--. Column 2, line 46, after "of" insert --a--; and line 68, after "and" insert --subsequent--. Column 3, line 44 and 45, after "beads" insert a period and delete "and does not involve a chemical treatment of the resin." Column 5, line 61, after "24" insert --and--; and line 63, change "horizontal" to --horizontally level--. Column 7, line 7, delete "has" and insert --permits--. Column 8, line 13, after "base" and before the comma insert --in tank 38--; and line 64, change "at" to --as--. Claim 3, line 1, change "18" to --1--.

Signed and sealed this 7th day of January 1975.

(SEAL)
Attest:

McCOY M. GIBSON JR.                       C. MARSHALL DANN
Attesting Officer                         Commissioner of Patents